(12) United States Patent
Wei et al.

(10) Patent No.: US 7,332,455 B2
(45) Date of Patent: Feb. 19, 2008

(54) CATALYST COMPONENT AND CATALYST FOR OLEFIN POLYMERIZATION AS WELL AS USE THEREOF

(75) Inventors: Chen Wei, Beijing (CN); Yuexiang Liu, Beijing (CN); Xianzhi Xia, Beijing (CN); Wenbo Song, Beijing (CN); Hongbin Du, Beijing (CN); Zifang Guo, Beijing (CN); Yang Tan, Beijing (CN); Zhaowen Ma, Beijing (CN); Weimin Ji, Beijing (CN); Zhichao Yang, Beijing (CN); Xiaodong Wang, Beijing (CN); Lei Guo, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 95 days.

(21) Appl. No.: 10/942,392

(22) Filed: Sep. 16, 2004

(65) Prior Publication Data

US 2005/0119427 A1   Jun. 2, 2005

(30) Foreign Application Priority Data

Sep. 18, 2003   (CN) .............................. 03 1 57185

(51) Int. Cl.
*C08F 4/64*       (2006.01)
*C08F 4/642*      (2006.01)

(52) U.S. Cl. .................. 502/120; 502/104; 502/115; 502/126; 502/127; 502/121; 526/124.6; 526/125.6

(58) Field of Classification Search ............. 526/124.6, 526/125.6; 502/120, 104, 115, 121, 126, 502/127
See application file for complete search history.

(56) References Cited

U.S. PATENT DOCUMENTS

| 4,784,983 | A  |   | 11/1988 | Mao et al. |
| 5,633,419 | A  | * | 5/1997  | Spencer et al. ............. 585/522 |
| 6,486,275 | B2 | * | 11/2002 | Sano et al. ............... 526/124.4 |
| 6,617,278 | B1 | * | 9/2003  | Jin et al. .................... 502/134 |
| 6,822,109 | B2 | * | 11/2004 | Xie et al. .................... 556/482 |

FOREIGN PATENT DOCUMENTS

| CN | 1035186  | 4/1990  |
| CN | 1298887  | 9/2001  |
| JP | 58183708 | 10/1983 |

* cited by examiner

*Primary Examiner*—Caixia Lu
(74) *Attorney, Agent, or Firm*—Ladas & Parry LLP

(57) ABSTRACT

The present invention relates to a catalyst component and a catalyst for olefin polymerization. The catalyst component utilizes magnesium halide and silica as composite support, and the particle morphology thereof can be improved by regulating the ratio of magnesium halide to silica. Further, the purpose of stabilizing the rate of catalytic polymerization reaction and improving the particle morphology of polymer so as to meet the requirements on catalyst performance of various polymerization processes can be achieved through the combination of the supports of the catalyst. In the meantime, when used in the polymerization of propylene, the catalyst of the present invention exhibits a relatively high polymerization activity and high stereospecificity.

13 Claims, No Drawings

US 7,332,455 B2

CATALYST COMPONENT AND CATALYST FOR OLEFIN POLYMERIZATION AS WELL AS USE THEREOF

CROSS REFERENCE OF RELATED APPLICATION

The present application claims the benefit of the Chinese Patent Application No. 03157185.9, filed on Sep. 18, 2003, which is incorporated herein by reference in its entirety and for all purposes.

FIELD OF THE INVENTION

The present invention relates to a catalyst component and a catalyst for olefin polymerization, especially for propylene polymerization or copolymerization, as well as use thereof, in particular, to a catalyst component with composite support and a catalyst as well as use thereof.

BACKGROUND ART OF THE INVENTION

It is well known that, in the technology of synthesizing polypropylene, Ti/Mg catalyst systems are widely used in the synthesis processes of isotactic polypropylene due to their characteristics such as high efficiency, high stereospecificity (isotacticity) and so on. The catalysts used in the industrial production of polypropylene should meet two main requirements: one is that the catalyst should exhibit a relatively high activity in polymerization reaction, and another is that the resultant polymer should exhibit good integrated performance. The main properties of polypropylene include isotacticity of polymer, molecular weight distribution, particle morphology of polymer etc. Among these the particle morphology of polymer is particularly important in the industrial scale production of polypropylene.

The known patents of Ti/Mg catalyst systems improve typically the polymer particle morphology by effectively controlling particle morphology of catalyst via the optimization of components and synthesis process of the catalyst, wherein the selection and preparation of catalyst support are extremely important.

In order to improve catalytic activity, many patents utilize various physical or chemical processes to prepare active magnesium chloride support, and then load the support with a transition metal titanium compound and an electron-donor compound to form an active center of the catalyst. For example, in U.S. Pat. No. 4,784,983, anhydrous magnesium chloride is firstly dissolved in a solvent system to form a solution, then titanium tetrachloride as active component and a polybasic carboxylic acid ester as electron-donor are added to the solution, and the temperature of the resultant solution is elevated in the presence of phthalate anhydride as co-precipitator so that solid catalyst component containing active center is precipitated. When used in the polymerization reaction of propylene, the catalyst exhibits characteristics such as high activity and high isotacticity. However, since the catalyst particles are prepared by precipitation process, the particle size of the catalyst is relatively small and the catalyst particle morphology is relatively difficult to be stably controlled by temperature programming. In addition, for facilitating the precipitation of solids, co-precipitator and a large amount of titanium tetrachloride, which increase the cost of catalyst and cause environment pollution problem, are required.

In addition, many known patents load magnesium chloride onto porous inorganic oxide support such as silica etc. to obtain a composite support of magnesium chloride and silica, then the composite support is treated with titanium halide and electron-donor compound to finally obtain a catalyst component for olefin polymerization. For example, GB2028347 discloses a process for preparing a catalyst component loaded onto a porous inorganic oxide support, comprising impregnating a silica support with a magnesium chloride solution, then evaporating the solvent to obtain a solid product, then reacting the solid product with a transition metal compound, especially a titanium compound. For another example, U.S. Pat. No. 4,913,995 discloses a technique for preparing a high performance polypropylene catalyst using silica as support, comprising dispersing a porous silica support containing surface hydroxyl groups into a solution of magnesium chloride in tetrahydrofuran, drying the resultant suspension to obtain a composite support $MgCl_2/SiO_2$, then treating said composite support with titanium tetrachloride and electron-donor compound to finally obtain a catalyst product. However, when the catalyst prepared from a support obtained via magnesium chloride solution impregnating process is used in the polymerization of propylene, the polymerization activity is not satisfying. This may be attributed to the fact that this impregnating process essentially utilizes the particle morphology of silica support itself to control the particle morphology of the final catalyst, while the particle size of porous silica is relatively large with average particle size being typically about 50 μm, so that the amount of active component loaded on silica is restricted, resulting in lower activity of the final catalyst.

Further, some known patents, such as CN1091748A, disclose a process comprising preparing a spherical support from a magnesium chloride-alcohol adduct and then loading a transition metal titanium compound and an electron-donor compound thereon. The polypropylene synthesized with this type of catalysts has a better polymer particle morphology, generally in spherical shape. However, since such spherical catalysts have relatively large particle size, they may readily be broken during the polymerization of propylene, and this is disadvantageous in the industrial scale production.

Thus, there still need a catalyst, which, when used in the polymerization of propylene, not only exhibits a relatively high catalytic activity and stereospecificity, but also can synthesize a polymer having a better particle morphology.

The present invention utilizes magnesium halide and silica as composite support, and improves the particle morphology of the catalyst by regulating the ratio of magnesium halide to silica. Further, the purpose of stabilizing the rate of catalytic polymerization reaction and improving the particle morphology of polymer so as to meet the requirements on catalyst performance of various polymerization processes can be achieved through the combination of the supports of the catalyst. In the meantime, when used in the polymerization of propylene, the catalyst exhibits relatively high polymerization activity and high stereospecificity.

THE DESCRIPTION OF THE INVENTION

The present invention relates to a catalyst component for olefin polymerization, which is prepared by a process comprising the steps of:

(1) dissolving a magnesium halide in a solvent system comprising an organic epoxy compound and an organo phosphorus compound, to form a homogenous solution;

(2) contacting and reacting said solution with at least one titanium compound of the general formula $Ti(OR^3)_{4-m}X_m$, in which $R^3$ is a $C_1$-$C_{14}$ aliphatic hydrocarbyl group, X is selected from the group consisting of F, Cl, Br and mixture thereof, and m is an integer of from 1 to 4, in the presence of an inorganic oxide, to precipitate a solid titanium-containing catalyst component;

with at least one inner electron-donor compound being introduced in any of said steps.

The term "polymerization" as used herein intends to include homopolymerization and copolymerization. The term "polymer" as used herein intends to include homopolymer, copolymer and terpolymer.

The present invention may dissolve a magnesium halide in a solvent system comprising an organic epoxy compound and an organo phosphorus compound to prepare a magnesium halide solution according to the process disclosed in U.S. Pat. No. 4,784,983, all relevant contents of which are incorporated herein by reference. The magnesium halide is selected from the group consisting of magnesium dihalides, water or alcohol complexes of magnesium dihalide, and derivatives of magnesium dihalide wherein one or two halogen atoms are replaced with hydrocarbyl groups or halogenated hydrocarbyl-oxy groups. The specific examples include magnesium dichloride, magnesium dibromide, phenoxy magnesium chloride, isopropoxy magnesium chloride, butoxy magnesium chloride, and the like, with magnesium dichloride being preferred. These magnesium halide compounds may be used alone or in combination.

The organic epoxy compound comprises at least one of aliphatic epoxy compounds and diepoxy compounds, halogenated aliphatic epoxy compounds and diepoxy compounds, glycidyl ether, and inner ethers, having from 2 to 8 carbon atoms. Examples include epoxy ethane, epoxy propane, epoxy butane, vinyl epoxy ethane, butadiene dioxide, epoxy chloropropane, glycidyl methyl ether, diglycidyl ether, and tetrahydrofuran.

The organo phosphorus compound is at least one of hydrocarbyl esters or halogenated hydrocarbyl esters of orthophosphoric acid or phosphorous acid. The examples include trimethyl orthophosphate, triethyl orthophosphate, tributyl orthophosphate, triphenyl orthophosphate, trimethyl phosphite, triethyl phosphite, tributyl phosphite and tribenzyl phosphite.

Based on per mole of magnesium halide, the amount of organic epoxy compound used is in a range of from 0.2 to 10 moles, preferably from 0.5 to 4 moles; and the amount of organo phosphorus compound used is in a range of from 0.1 to 5 moles, preferably from 0.3 to 1.0 moles.

For more sufficiently dissolving magnesium halide, an inert diluent is optionally added in the solvent system. The inert diluent may generally be hexane, heptane, octane, benzene, toluene, xylene, 1,2-dichloroethane, chlorobenzene and other hydrocarbons or halogenated hydrocarbons, as long as it can facilitate the dissolution of magnesium halide. These inert diluents may be used alone or in combination. The amount of the inert diluent, if used, is not particularly important, however, it can be in a range of from 0.2 to 10 liters per mole of magnesium halide.

The dissolving temperature is between 10° C. and 150° C., and the upper limit of the temperature is generally not higher than the boiling point of the solvent.

The dissolving time is determined according to the complete dissolution.

In the preparation of magnesium halide solution, the individual components of the solution can be added randomly.

In the presence of an inorganic oxide, the solution contacts and reacts with at least one titanium compound of the general formula $Ti(OR^3)_{4-m}X_m$, in which $R^3$ is a $C_1$-$C_{14}$ aliphatic hydrocarbyl group, X is selected from the group consisting of F, Cl, Br and mixture thereof, and m is an integer of from 1 to 4, to precipitate a solid titanium-containing catalyst component. The examples of the titanium compound include titanium tetrachloride, titanium tetrabromide, titanium tetraiodide, tetrabutoxy titanium, tetraethoxy titanium, triethoxy titanium chloride, diethoxy titanium dichloride, ethoxy titanium trichloride and mixtures thereof, with titanium tetrachloride being preferred. The titanium compound should be miscible in an apolar solvent at the application temperature.

The inorganic oxide is preferably silica having an average particle diameter of from 0.5 to 80 μm, preferably from 2 to 30 μm. Generally, the silica is treated by heating to remove water before it is used. The silica can be introduced before, during or after the contact of magnesium halide solution and the titanium compound, preferably after the magnesium halide solution is mixed with the titanium compound.

The amount of the added silica is in a range of from 0.1 to 10 grams, preferably from 0.5 to 5 grams, per gram of magnesium halide.

The temperature for adding the silica is in a range of from −40° C. to 100° C., preferably from −30° C. to 0° C.

The amount of the added titanium compound is in a range of from 1 to 20 moles, preferably from 4 to 10 moles, per mole of magnesium halide.

The temperature for contacting titanium compound with magnesium halide solution is preferably in a range of from −40° C. to 0° C. For facilitating the control of reaction, preferably, the titanium compound is added into the magnesium halide solution to allow them react, and then the silica support is added. Solid catalyst component particles precipitate in the course of elevating the temperature of the reaction system. Adjusting the rate of elevating the temperature can regulate the particle size of the catalyst component, and the temperature should be controlled below the boiling point of the solvent.

In the preparation of catalyst component of the present invention, at least one electron-donor compound is added. Use of inner electron-donor compound in the catalyst for, for example, propylene polymerization is well known in the art, and all commonly used inner electron-donor compounds can be used in the present invention. The examples of inner electron-donor compounds useful in the invention include, but are not limited to:

(i) Aliphatic or aromatic polybasic carboxylic acid ester compounds, such as phthalates, malonates, succinates, glutarates, adipates, pivalates, maleates, naphthalene dicarboxylates, trimellitates, benzene-1,2,3-tricarboxylic acid esters, pyromellitates and carbonates. Examples include diethyl malonate, dibutyl adipate, diethyl phthalate, diisobutyl phthalate, di-n-butyl phthalate, diisooctyl phthalate, diethyl maleate, di-n-butyl maleate, diethyl naphthalene dicarboxylate, dibutyl naphthalene dicarboxylate, triethyl trimellitate, tributyl trimellitate, benzene-1,2,3-tricarboxylic acid triethyl ester, benzene-1,2,3-tricarboxylic acid tributyl ester, tetraethyl pyromellitate, tetrabutyl pyromellitate etc.

(ii) Polyol ester compounds, such as a polyol ester of the general formula (I), $$R_1-\overset{O}{\underset{\|}{C}}-O-\underset{\underset{R_4}{|}}{\overset{\overset{R_3}{|}}{C}}\left[\underset{\underset{R^1}{|}}{\overset{\overset{R^{n+1}}{|}}{C}}\cdots\underset{\underset{R^n}{|}}{\overset{\overset{R^{2n}}{|}}{C}}\right]\underset{\underset{R_6}{|}}{\overset{\overset{R_5}{|}}{C}}-O-\overset{O}{\underset{\|}{C}}-R_2 \qquad (I)$$

wherein $R_1$ to $R_6$ and $R^1$ to $R^{2n}$, which may be identical or different, can be hydrogen, halogen, or optionally substituted linear or branched $C_1$-$C_{20}$ alkyl, $C_3$-$C_{20}$ cycloalkyl, $C_6$-$C_{20}$ mono-ring or multi-ring aryl, $C_7$-$C_{20}$ alkylaryl, $C_7$-$C_{20}$ arylalkyl, $C_2$-$C_{10}$ alkenyl, or $C_2$-$C_{10}$ ester group, with the proviso that $R_1$ and $R_2$ are not hydrogen, $R_3$ to and $R^1$ to $R^{2n}$ optionally comprise one or more heteroatoms, which are selected from the group consisting of nitrogen, oxygen, sulfur, silicon, phosphorus and halogen, replacing carbon or hydrogen or the both, and one or more of $R_3$ to $R_6$ and $R^1$ to $R^{2n}$ may be linked to form a ring; and n is an integer ranging from 0 to 10.

These polyol ester compounds are disclosed in detail in WO 03/068828 and WO 03/068723, all relevant contents of which are incorporated herein by reference.

Among said polyol ester compounds, the preferred is a compound of the general formula (II),

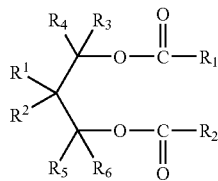

(II)

wherein $R_1$ to $R_6$ and $R^1$ to $R^{2n}$ are as defined in the general formula (I).

In the polyol ester compounds represented by the general formulae (I) and (II), it is preferred that $R_3$, $R_4$, $R_5$ and $R_6$ are not simultaneously hydrogen, and at least one of $R_3$, $R_4$, $R_5$ and $R_6$ is selected from the group consisting of halogen, $C_1$-$C_{10}$ linear or branched alkyl, $C_3$-$C_{10}$ cycloalkyl, $C_6$-$C_{10}$ aryl, $C_7$-$C_{10}$ alkylaryl or arylalkyl.

In addition, the compounds of the general formula (I) further include a compound of the general formula (III):

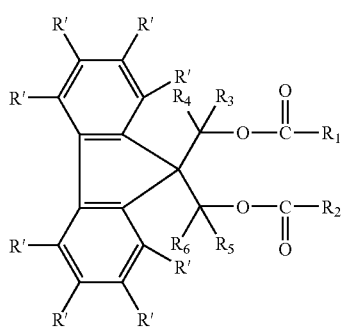

(III)

wherein groups $R_1$-$R_6$ are as defined in the general formula (I); R' is identical or different, and can be hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl, or $C_7$-$C_{20}$ arylalkyl.

In the polyol ester compounds represented by the formulae (I), (II) and (III), it is preferred that at least one of $R_1$ and $R_2$ is selected from the group consisting of phenyl, halophenyl, alkylphenyl and haloalkyl-phenyl.

Examples of said polyol ester compounds as electron-donor useful in the catalyst component of the present invention include: propan-1,2-diol dibenzoate, propan-1,2-diol di(p-chlorobenzoate), propan-1,2-diol di(m-chlorobenzoate), propan-1,2-diol di(p-bromobenzoate), propan-1,2-diol di(o-bromobenzoate), propan-1,2-diol di(p-methylbenzoate), propan-1,2-diol di(p-tert-butylbenzoate), propan-1,2-diol di(p-butylbenzoate), propan-1,2-diol monobenzoate monocinnamate, propan-1,2-diol dicinnamate, 2-methyl-propan-1,2-diol dibenzoate, 2-methyl-propan-1,2-diol di(p-chlorobenzoate), 2-methyl-propan-1,2-diol di(m-chlorobenzoate), 2-methyl-propan-1,2-diol di(p-bromobenzoate), 2-methyl-propan-1,2-diol di(o-bromobenzoate), 2-methyl-propan-1,2-diol di(p-methylbenzoate), 2-methyl-propan-1,2-diol di(p-tert-butylbenzoate), 2-methyl-propan-1,2-diol di(p-butylbenzoate), 2-methyl-propan-1,2-diol monobenzoate monocinnamate, 2-methyl-propan-1,2-diol dicinnamate, propan-1,3-diol dibenzoate, 2-methyl-propan-1,3-diol dibenzoate, 2-ethyl-propan-1,3-diol dibenzoate, 2-propyl-propan-1,3-diol dibenzoate, 2-butyl-propan-1,3-diol dibenzoate, 2,2-dimethyl-propan-1,3-diol dibenzoate, (R)-1-phenyl-propan-1,3-diol dibenzoate, (S)-1-phenyl-propan-1,3-diol dibenzoate, 1,3-diphenyl-propan-1,3-diol dibenzoate, 1,3-diphenyl-2-methyl-propan-1,3-diol dibenzoate, 1,3-diphenyl-propan-1,3-diol dipropionate, 1,3-diphenyl-2-methyl-propan-1,3-diol dipropionate, 1,3-diphenyl-2-methyl-propan-1,3-diol diacetate, 1,3-diphenyl-2,2-dimethyl-propan-1,3-diol dibenzoate, 1,3-diphenyl-2,2-dimethyl-propan-1,3-diol dipropionate, 1,3-di-tert-butyl-2-ethyl-propan-1,3-diol dibenzoate, 1,3-diphenyl-propan-1,3-diol diacetate, 2-butyl-2-ethyl-propan-1,3-diol dibenzoate, 2,2-diethyl-propan-1,3-diol dibenzoate, 2,2-di(methoxymethyl)-propan-1,3-diol dibenzoate, 2-methyl-2-propyl-propan-1,3-diol dibenzoate, 2-isopentyl-2-isopropyl-propan-1,3-diol dibenzoate, 2-isopentyl-2-isopropyl-propan-1,3-diol di(p-chlorobenzoate), 2-isopentyl-2-isopropyl-propan-1,3-diol di(m-chlorobenzoate), 2-isopentyl-2-isopropyl-propan-1,3-diol di(p-methoxybenzoate), 2-isopentyl-2-isopropyl-propan-1,3-diol di(p-methylbenzoate), 2-isopentyl-2-isopropyl-propan-1,3-diol monobenzoate monopropionate, 2-isopentyl-2-isopropyl-propan-1,3-diol dipropionate, 2-isopentyl-2-isopropyl-propan-1,3-diol diacrylate, 2-isopentyl-2-isopropyl-propan-1,3-diol dicinnamate, 2,2-diisobutyl-propan-1,3-diol dibenzoate, 2-isopentyl-2-isopropyl-propan-1,3-diol 2,2'-biphenyl dicarboxylate, 2-isopentyl-2-isopropyl-propan-1,3-diol phthalate, 1,3-diisopropyl-propan-1,3-diol di(4-butylbenzoate), 2-ethyl-2-methyl-propan-1,3-diol dibenzoate, 2-amino-1-phenyl-propan-1,3-diol dibenzoate, 2,2-dimethyl-propan-1,3-diol dibenzoate, butan-1,2-diol dibenzoate, 2-methyl-butan-1,2-diol dibenzoate, 2,3-dimethyl-butan-1,2-diol dibenzoate, 2,3-dimethyl-butan-1,2-diol di(p-chlorobenzoate), 2,3,3-trimethyl-butan-1,2-diol dibenzoate, 2,3,3-trimethyl-butan-1,2-diol di(p-chlorobenzoate), butan-1,2-diol di(p-chlorobenzoate), butan-2,3-diol dibenzoate, butan-2,3-diol di(o-bromobenzoate), butan-2,3-diol di(methylbenzoate), butan-2,3-diol di(m-chlorobenzoate), 2-methyl-butan-2,3-diol dibenzoate, 2-methyl-butan-2,3-diol di(o-bromobenzoate), 2-methyl-butan-2,3-diol di(methylbenzoate), 2-methyl-butan-2,3-diol di(m-chlorobenzoate), 2,3-dimethyl-butan-2,3-diol dibenzoate, 2,3-dimethyl-butan-2,3-diol di(o-bromobenzoate), 2,3-dimethyl-butan-2,3-diol di(methylbenzoate), 2,3-dimethyl-butan-2,3-diol di(m-chlorobenzoate), 2-methyl-1-phenyl-butan-1,3-diol dibenzoate, 2-methyl-1-phenyl-butan-1,3-diol dipivalate, 2-methyl-2-(2-furyl)-butan-1,3-diol dibenzoate, butan-1,4-diol dibenzoate, 2,3-diisopropyl-butan-1,4-diol dibenzoate, 2,3-dimethyl-butan-1,4-diol dibenzoate, 2,3-diethyl-butan-1,4-diol dibenzoate, 2,3-dibutyl-butan-1,4-diol dibenzoate, 2,3-diisopropyl-butan-1,4-diol dibutyrate, 4,4,4-trifluoro-1-(2-naphthyl)-butan-1,3-diol dibenzoate, pentan-2,3-diol dibenzoate, 2-methyl-pentan-2,3-diol dibenzoate, 3-methyl-pentan-2,3-diol dibenzoate, 4-methyl-pentan-2,3-diol dibenzoate, 2,3-dimethyl-pentan-2,3-diol dibenzoate, 2,4-dimethyl-pentan-2,3-diol dibenzoate, 3,4-dimethyl-pentan-2,3-diol dibenzoate, 4,4-dimethyl-pentan-2,3-diol dibenzoate, 2,3,4-dimethyl-pentan-2,3-diol dibenzoate, 2,4,4-trimethyl-pentan-2,3-diol dibenzoate, 3,4,4-trimethyl-pentan-2,3-diol dibenzoate, 2,3,4,4-tetramethyl-pentan-2,3-diol dibenzoate, 3-ethyl-pentan-2,3-diol dibenzoate, 3-ethyl-2-methyl-pentan-2,3-diol dibenzoate, 3-methyl-2,4-dimethyl-pentan-2,3-diol dibenzoate, 3-ethyl-2,4,4-trimethyl-pentan-2,3-diol dibenzoate, pentan-2,4-diol dibenzoate, 3-methyl-pentan-2,4-diol dibenzoate, 3-ethyl-pentan-2,4-diol dibenzoate, 3-propyl-pentan-2,4-diol dibenzoate, 3-butyl-pentan-2,4-diol dibenzoate, 3,3-dimethyl-pentan-2,4-diol dibenzoate, (2S,4S)-(+)-pentan-2,4-diol dibenzoate, (2R,4R)-(+)-pentan-2,4-diol dibenzoate, pentan-2,4-diol di(o-chlorobenzoate), pentan-2,4-diol di(m-chlorobenzoate), pentan-2,4-diol di(p-bromobenzoate), pentan-2,4-diol di(o-bromobenzoate), pentan-2,4-diol di(m-methylbenzoate), pentan-2,4-diol di(p-tert-butylbenzoate), pentan-2,4-diol di(p-butylbenzoate), pentan-2,4-diol monobenzoate monocinnamate, pentan-2,4-diol dicinnamate, pentan-1,3-diol dipropionate, 2-methyl-pentan-1,3-diol dibenzoate, 2-methyl-pentan-1,3-diol di(p-chlorobenzoate), 2-methyl-pentan-1,3-diol di(p-methylbenzoate), 2-butyl-pentan-1,3-diol di(p-methylbenzoate), 2-methyl-pentan-1,3-diol di(p-tert-butylbenzoate), 2-methyl-pentan-1,3-diol dipivalate, 2-methyl-pentan-1,3-diol monobenzoate monocinnamate, 2,2-dimethyl-pentan-1,3-diol dibenzoate, 2,2-dimethyl-pentan-1,3-diol monobenzoate monocinnamate, 2-ethyl-pentan-1,3-diol dibenzoate, 2-butyl-pentan-1,3-diol dibenzoate, 2-allyl-pentan-1,3-diol dibenzoate, 2-methyl-pentan-1,3-diol monobenzoate monocinnamate, 2-methyl-pentan-1,3-diol dibenzoate, 2-ethyl-pentan-1,3-diol dibenzoate, 2-propyl-pentan-1,3-diol dibenzoate, 2-butyl-pentan-1,3-diol dibenzoate, pentan-1,3-diol di(p-chlorobenzoate), pentan-1,3-diol di(m-chlorobenzoate), pentan-1,3-diol di(p-bromobenzoate), pentan-1,3-diol di(o-bromobenzoate), pentan-1,3-diol di(p-methylbenzoate), pentan-1,3-diol di(p-tert-butylbenzoate), pentan-1,3-diol di(p-butylbenzoate), pentan-1,3-diol monobenzoate monocinnamate, pentan-1,3-diol dicinnamate, 2,2,4-trimethyl-pentan-1,3-diol dibenzoate, 2,2,4-trimethyl-pentan-1,3-diol di(isopropyl-formate), 1-trifluoromethyl-3-methyl-pentan-2,4-diol dibenzoate, pentan-2,4-diol di(p-fluoromethylbenzoate), pentan-2,4-diol di(2-furancarboxylate), 3-butyl-3-methyl-pentan-2,4-diol dibenzoate, 2,2-dimethyl-pentan-1,5-diol dibenzoate, 1,5-diphenyl-pentan-1,5-diol dibenzoate, 1,5-diphenyl-pentan-1,5-diol dipropionate, hexan-2,3-diol dibenzoate, 2-methyl-hexan-2,3-diol dibenzoate, 3-methyl-hexan-2,3-diol dibenzoate, 4-methyl-hexan-2,3-diol dibenzoate, 5-methyl-hexan-2,3-diol dibenzoate, 2,3-dimethyl-hexan-2,3-diol dibenzoate, 2,4-dimethyl-hexan-2,3-diol dibenzoate, 2,5-dimethyl-hexan-2,3-diol dibenzoate, 3,4-dimethyl-hexan-2,3-diol dibenzoate, 3,5-dimethyl-hexan-2,3-diol dibenzoate, 4,4-dimethyl-hexan-2,3-diol dibenzoate, 4,5-dimethyl-hexan-2,3-diol dibenzoate, 5,5-dimethyl-hexan-2,3-diol dibenzoate, 2,3,4-trimethyl-hexan-2,3-diol dibenzoate, 2,3,5-trimethyl-hexan-2,3-diol dibenzoate, 2,4,4-trimethyl-hexan-2,3-diol dibenzoate, 2,4,5-trimethyl-hexan-2,3-diol dibenzoate, 2,5,5-trimethyl-hexan-2,3-diol dibenzoate, 3,4,4-trimethyl-hexan-2,3-diol dibenzoate, 3,4,5-trimethyl-hexan-2,3-diol dibenzoate, 3,5,5-trimethyl-hexan-2,3-diol dibenzoate, 2,3,4,4-tetramethyl-hexan-2,3-diol dibenzoate, 2,3,4,5-tetramethyl-hexan-2,3-diol dibenzoate, 2,3,5,5-tetramethyl-hexan-2,3-diol dibenzoate, 3-ethyl-hexan-2,3-diol dibenzoate 3-propyl-hexan-2,3-diol dibenzoate, 3-isopropyl-hexan-2,3-diol dibenzoate, 4-ethyl-hexan-2,3-diol dibenzoate, 3-ethyl-2-methyl-hexan-2,3-diol dibenzoate, 4-ethyl-2-methyl-hexan-2,3-diol dibenzoate, 2-methyl-3-propyl-hexan-2,3-diol dibenzoate, 4-ethyl-3-methyl-hexan-2,3-diol dibenzoate, 3,4-diethyl-hexan-2,3-diol dibenzoate, 4-ethyl-3-propyl-hexan-2,3-diol dibenzoate, 3-ethyl-2,4-dimethyl-hexan-2,3-diol dibenzoate, 3-ethyl-2,5-dimethyl-hexan-2,3-diol dibenzoate, 3-ethyl-2,4,4-trimethyl-hexan-2,3-diol dibenzoate, 3-ethyl-2,4,5-trimethyl-hexan-2,3-diol dibenzoate, 2,4-dimethyl-3-propyl-hexan-2,3-diol dibenzoate, 2,5-dimethyl-3-propyl-hexan-2,3-diol dibenzoate, 2,4,4-trimethyl-3-propyl-hexan-2,3-diol dibenzoate, 2,5,5-trimethyl-3-propyl-hexan-2,3-diol dibenzoate, 2,4,5-trimethyl-3-propyl-hexan-2,3-diol dibenzoate, 3,4-diethyl-2-methyl-hexan-2,3-diol dibenzoate, 2-ethyl-hexan-1,3-diol dibenzoate, 2-propyl-hexan-1,3-diol dibenzoate, 2-butyl-hexan-1,3-diol dibenzoate, 4-ethyl-hexan-1,3-diol dibenzoate, 4-methyl-hexan-1,3-diol dibenzoate, 3-methyl-hexan-1,3-diol dibenzoate, 3-ethyl-hexan-1,3-diol dibenzoate, 2,2,4,6,6-pentamethyl-hexan-3,5-diol dibenzoate, hexan-2,5-diol dibenzoate, 2,5-dimethyl-hexan-2,5-diol dibenzoate, 2,5-dimethyl-hexan-2,5-diol dipropionate, 2,5-dimethyl-hex-3-yn-2,5-diol dibenzoate, hexa-3-yn-2,5-diol dibenzoate (T), hexa-3-yn-2,5-diol dibenzoate (S), hexa-3-yn-2,5-diol di(2-furylcarboxylate), 3,4-dibutyl-hexan-1,6-diol dibenzoate, hexan-1,6-diol dibenzoate, hepta-6-en-2,4-diol dibenzoate, 2-methyl-hepta-6-en-2,4-diol dibenzoate, 3-methyl-hepta-6-en-2,4-diol dibenzoate, 4-methyl-hepta-6-en-2,4-diol dibenzoate, 5-methyl-hepta-6-en-2,4-diol dibenzoate, 6-methyl-hepta-6-en-2,4-diol dibenzoate, 3-ethyl-hepta-6-en-2,4-diol dibenzoate, 4-ethyl-hepta-6-en-2,4-diol dibenzoate, 5-ethyl-hepta-6-en-2,4-diol dibenzoate, 6-ethyl-hepta-6-en-2,4-diol dibenzoate, 3-propyl-hepta-6-en-2,4-diol dibenzoate, 4-propyl-hepta-6-en-2,4-diol dibenzoate, 5-propyl-hepta-6-en-2,4-diol dibenzoate, 6-propyl-hepta-6-en-2,4-diol dibenzoate, 3-butyl-hepta-6-en-2,4-diol dibenzoate, 4-butyl-hepta-6-en-2,4-diol dibenzoate, 5-butyl-hepta-6-en-2,4-diol dibenzoate, 6-butyl-hepta-6-en-2,4-diol dibenzoate, 3,5-dimethyl-hepta-6-en-2,4-diol dibenzoate, 3,5-diethyl-hepta-6-en-2,4-diol dibenzoate, 3,5-propyl-hepta-6-en-2,4-diol dibenzoate, 3,5-dibutyl-hepta-6-en-2,4-diol dibenzoate, 3,3-dimethyl-hepta-6-en-2,4-diol dibenzoate, 3,3-diethyl-hepta-6-en-2,4-diol dibenzoate, 3,3-dipropyl-hepta-6-en-2,4-diol dibenzoate, 3,3-dibutyl-hepta-6-en-2,4-diol dibenzoate, heptan-3,5-diol dibenzoate, 2-methyl-heptan-3,5-diol dibenzoate, 3-methyl-heptan-3,5-diol dibenzoate, 4-methyl-heptan-3,5-diol dibenzoate, 5-methylheptan-3,5-diol dibenzoate, 6-methyl-heptan-3,5-diol dibenzoate, 3-ethyl-heptan-3,5-diol dibenzoate, 4-ethyl-heptan-3,5-diol dibenzoate, 5-ethyl-heptan-3,5-diol dibenzoate, 3-propyl-heptan-3,5-diol dibenzoate, 4-propyl-heptan-3,5-diol dibenzoate, 3-butyl-heptan-3,5-diol dibenzoate, 2,3-dimethyl-heptan-3,5-diol dibenzoate, 2,4-dimethyl-heptan-3,5-diol dibenzoate, 2,5-dimethyl-heptan-3,5-diol dibenzoate, 2,6-dimethyl-heptan-3,5-diol dibenzoate, 3,3-dimethyl-heptan-3,5-diol dibenzoate, 4,4-dimethyl-heptan-3,5-diol dibenzoate, 6,6-dimethyl-heptan-3,5-diol dibenzoate, 2,6-dimethyl-heptan-3,5-diol dibenzoate, 3,4-dimethyl-heptan-3,5-diol dibenzoate, 3,5-dimethyl-heptan-3,5-diol dibenzoate, 3,6-dimethyl-heptan-3,5-diol dibenzoate, 4,5-dimethyl-heptan-3,5-diol dibenzoate, 4,6-dimethyl-heptan-3,5-diol dibenzoate, 4,4-dimethyl-heptan-3,5-diol dibenzoate, 3-ethyl-2-methyl-heptan-3,5-diol dibenzoate, 4-ethyl-2-methyl-heptan-3,5-diol dibenzoate, 5-ethyl-2-methyl-heptan-3,5-diol dibenzoate, 3-ethyl-3-methyl-heptan-3,5-diol dibenzoate, 4-ethyl-3-methyl-heptan-3, 5-diol dibenzoate, 5-ethyl-3-methyl-heptan-3,5-diol dibenzoate, 3-ethyl-4-methyl-heptan-3,5-diol dibenzoate, 4-ethyl-4-methyl-heptan-3,5-diol dibenzoate, 5-ethyl-4-methyl-heptan-3,5-diol dibenzoate, 2-methyl-3-propyl-heptan-3,5-diol dibenzoate, 2-methyl-4-propyl-heptan-3,5-diol dibenzoate, 2-methyl-5-propyl-heptan-3,5-diol dibenzoate, 3-methyl-3-propyl-heptan-3,5-diol dibenzoate, 3-methyl-4-propyl-heptan-3,5-diol dibenzoate, 3-methyl-5-propyl-heptan-3,5-diol dibenzoate, 4-methyl-3-propyl-heptan-3,5-diol dibenzoate, 4-methyl-4-propyl-heptan-3,5-diol dibenzoate, 4-methyl-5-propyl-heptan-3,5-diol dibenzoate, 6-methyl-heptan-1,4-diol di(p-chlorobenzoate), 6-methyl-heptan-2,4-diol di(p-methylbenzoate), 6-methyl-heptan-2,4-diol di(m-methylbenzoate), 6-methyl-heptan-2,4-diol dipivalate, heptan-6-en-2,4-diol dipivalate, 3,6-dimethyl-heptan-2,4-diol dibenzoate, 2,2,6,6-tetramethyl-heptan-3,5-diol dibenzoate, 2,6-dimethyl-heptan-2,6-diol dibenzoate, 4-methyl-octan-3,5-diol dibenzoate, 4-ethyl-octan-3,5-diol dibenzoate, 4-propyl-octan-3,5-diol dibenzoate, 5-propyl-octan-3,5-diol dibenzoate, 4-butyl-octan-3,5-diol dibenzoate, 4,4-dimethyl-octan-3,5-diol dibenzoate, 4,4-diethyl-octan-3,5-diol dibenzoate, 4,4-dipropyl-octan-3,5-diol dibenzoate, 4-ethyl-4-methyl-octan-3,5-diol dibenzoate, 3-phenyl-octan-3,5-diol dibenzoate, 3-ethyl-2-methyl-octan-3,5-diol dibenzoate, 4-ethyl-2-methyl-octan-3,5-diol dibenzoate, 5-ethyl-2-methyl-octan-3,5-diol dibenzoate, 6-ethyl-2-methyl-octan-3,5-diol dibenzoate, 5-methyl-nonan-4,6-diol dibenzoate, 5-ethyl-nonan-4,6-diol dibenzoate, 5-propyl-nonan-4,6-diol dibenzoate, 5-butyl-nonan-4,6-diol dibenzoate, 5,5-dimethyl-nonan-4,6-diol dibenzoate, 5,5-diethyl-nonan-4,6-diol dibenzoate, 5,5-dipropyl-nonan-4,6-diol dibenzoate, 5,5-dibutyl-nonan-4,6-diol dibenzoate, 4-ethyl-5-methyl-nonan-4,6-diol dibenzoate, 5-phenyl-nonan-4,6-diol dibenzoate, nonan-4,6-diol dibenzoate, cyclohexane-1,1-dimethanol dibenzoate, cyclohexan-1,2-diol dibenzoate, cyclohexan-1,3-diol dibenzoate, cyclohexan-1,4-diol dibenzoate, 1,1-di(benzoyloxymethyl)cyclohexane, 11,4-di(benzoyloxymethyl)cyclohexane, 1,1-di(benzoyloxymethyl)cyclohexa-3-ene, 1,1-dipropionyloxymethyl)cyclohexa-3-ene, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnamoyloxymethyl)fluorene, 9-(benzoyloxymethyl)-9-(propionyloxymethyl)fluorene, 9,9-bis(pripionyloxymethyl)fluorene, 9,9-bis(acryloxymethyl)fluorene, 9,9-bispivaloyloxymethyl)fluorene, fluoren-9,9-dimethanol dibenzoate, 1,2-phenylene dibenzoate, 1,3-phenylene dibenzoate, 1,4-phenylene dibenzoate, 2,2'-biphenylene dibenzoate, bis(2-hydroxylnaphthyl)methane dibenzoate, benzene-1,2-dimethanol dibenzoate, benzene-1,3-dimethanol dibenzoate, benzene-1,4-dimethanol dibenzoate, 2,2'-dimethylol-biphenyl dipivalate, 2,2'-dimethylol-biphenyl dibenzoate, 2,2'-dimethylol-biphenyl dipropionate, 2,2'-dimethylol-binaphthyl dibenzoate, 2,5-di(cinnamoyloxy)hexane, pentaerythritol tetrabenzoate, 1,2,3-propanetriol tribenzoate.

(iii) Diether compounds, such as 1,3-diether compounds represented by the general formula (IV),

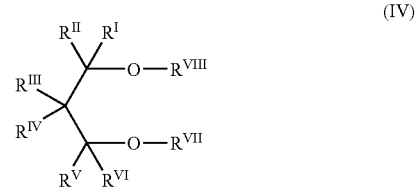

wherein $R^I$, $R^{II}$, $R^{III}$, $R^{IV}$, $R^V$ and $R^{VI}$, which may be identical or different, can be selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl, and $R^{VII}$ and $R^{VIII}$, which may be identical or different, can be selected from the group consisting of linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and groups $R^I$ to $R^{VI}$ may link each other to form a ring. The preferred is those 1,3-diethers wherein $R^{VII}$ and $R^{VIII}$ are selected from the group consisting of $C_1$-$C_4$ alkyl. These 1,3-diether compounds are disclosed in Chinese Patent ZL89108368.5 and CN11411285A, the relevant contents of which are incorporated herein by reference.

The electron-donor compound can be added to the reaction system during any step of the process for the preparation of the catalyst component, and is preferably added after the formation of catalyst particles.

The inner electron-donor compound can be used in an amount commonly used in the art. In general, the inner electron-donor compound is used in an amount of from 0.01 to 5.0 moles, preferably from 0.05 to 1.0 moles, per mole of magnesium halide.

The formed catalyst component particles can be subjected to conventional treating steps of washing, drying etc. to obtain a free flow solid powder of the catalyst component. For regulating the titanium content in the catalyst component, the catalyst component particles are optionally treated for one or more times.

The obtained catalyst component has a titanium content of from 0.5 to 5% by weight, a magnesium content of from 5 to 20% by weight, and a silicon content of from 5 to 25% by weight, based on the total weight of the catalyst component, and has a specific surface area of from 200 to 480 $m^2/g$, and a pore volume of from 0.9 to 2.0 ml/g.

In addition, the present invention further relates to a catalyst for olefin polymerization, comprising the reaction product of the following components:

(1) the foregoing catalyst component according to the present invention (active component);

(2) an alkylaluminum compound component represented by the formula of $AlR^1_nX_{3-n}$, wherein R's are identical or different, and can be $C_1$-$C_{20}$ linear, branched or cyclic alkyl, X is halogen, and n=1, 2 or 3. The preferable compound is triethyl aluminum, triisobutyl aluminum, tri-n-butyl aluminum, tri-n-hexyl aluminum, alkyl aluminum chloride, such as $AlEt_2Cl$, $Al(n-C_8H_{17})_3$, etc. These alkylaluminum compounds can be used alone or in combination; and (3) optionally, an external electron-donor compound, such as an organic silicon compound of the general formula $R_nSi(OR')_{4-n}$, wherein $0 \leq n \leq 3$, R and R', which may be identical or different, are $C_1$-$C_{20}$alkyl, $C_3$-$C_{20}$cycloalkyl, $C_6$-$C_{20}$aryl, halo-$C_1$-$C_{20}$alkyl, and R can also be halogen or hydrogen.

In many cases, especially when the catalyst is used for the preparation of an isotactic polypropylene, the external electron-donor compound is very necessary. However, when some inner electron-donor compounds, such as a polyol ester compound of the general formula (I) or a 1,3-diether compound of the general formula (IV), are used the external electron-donor may be omitted.

In the catalyst of the present invention, the proportion of solid catalyst component (1), alkylaluminum compound component (2) and external electron-donor compound component (3) is, expressed as molar ratio of Ti:Al:Si, 1:(5-1000):(0-500).

The component (2) and optional component (3) can, separately or as a mixture, contact and react with the active component.

The foregoing catalyst is suitable for the polymerization of an olefin $CH_2$=CHR (wherein R is H, or alkyl or aryl having 1 to 6 carbon atoms) and a feed containing said olefin and a small amount of diene, if necessary.

Therefore, in another aspect, the present invention relates to a process for polymerizing olefin, comprising contacting an olefin of formula $CH_2$=CHR, wherein R is H, or alkyl or aryl having 1 to 6 carbon atoms, optionally another kind of said olefin, and optionally a diene, with the catalyst of the invention under polymerization conditions.

The polymerization of olefin(s) is carried out in liquid phase of liquid monomer or a solution of monomer in an inert solvent, or in gas phase, or in a combination of gas phase and liquid phase, according the known processes. The polymerization is generally carried out at a temperature of from 0° C. to 150° C., preferably from 60° C. to 100° C., and at normal or higher pressure.

It is pointed out that an inorganic oxide such as silica is used as precipitator during the precipitation of the catalyst component, so that active component is loaded onto a composite support of magnesium halide and silica, thus the obtained catalyst component has a high specific surface area, a high pore volume, a small and uniform particle diameter and so on. When said catalyst is used in olefin polymerization, especially in propylene polymerization, the resultant polymer possesses merits of uniform distribution of particle size and low level of fine powder. In the meantime, the particle morphology of catalyst can be improved by adjusting the proportion of Mg/Si of magnesium halide and silica, and the obtained catalyst particles are tough and is not easily broken during the polymerization, and are especially suitable for gas phase polymerization.

THE PREFERRED EMBODIMENTS FOR CARRYING OUT THE INVENTION

The following examples are provided to further illustrate the present invention and by no means intended to limit the scope thereof.

EXAMPLE 1

1. Preparation of the Solid Catalyst Component

To a glass flask, in which air had been completely replaced with high pure $N_2$, were added successively 5.0 g of anhydrous magnesium dichloride, 100 ml of toluene, 7.0 ml of epoxy chloropropane, and 8.0 ml of tributyl phosphate. The mixture was heated at 60° C. to dissolve the solid completely. The solution was cooled to −25° C. and 40 ml of TiCl were added dropwise thereto, followed by the addition of 3.0 g of silica (available from GRACE Corp., 2212 grade, $d_{50}$=11 µm, and the silica was dried at 600° C. for 4 hours before it was used). Then the temperature was raised slowly to 80° C., and 10 ml of diisooctyl phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 11 g of solid catalyst components were obtained. The particle sizes of silica and the obtained catalyst component are shown in Table 1.

2. Polymerization of Propylene:

In a 5 L stain-less steel autoclave wherein air was sufficiently replaced with $N_2$, 9.4 mg of the foregoing solid catalyst component, 2.5 mmol of triethyl aluminum and 1.0 mmol of cyclohexyl-methyl-dimethoxy-silane (CHMMS) were charged, then 1 L (standard volume) of hydrogen gas was added, and liquid propylene was added until the total volume was 2.3 L. The reactor was heated to 70° C. The polymerization was carried out at 70° C. for 2 hours, and 250 g of polymer were obtained. The polymerization results are shown in Table 2.

EXAMPLE 2

1. Preparation of the Solid Catalyst Component

The procedure as described in Example 1 was followed, except for the amount of silica being changed as 1.5 g. The particles sizes of silica and the obtained catalyst component are shown in Table 1.

Polymerization of propylene: being carried out according to Example 1. The polymerization results are shown in Table 2.

COMPARATIVE EXAMPLE 1

1. Preparation of the Solid Catalyst Component

To a glass flask, in which air had been completely replaced with high pure $N_2$, were added successively 5.0 g of anhydrous magnesium dichloride, 100 ml of toluene, 7.0 ml of epoxy chloropropane, and 8.0 ml of tributyl phosphate. The mixture was heated at 60° C. to dissolve the solid completely. Then 1.0 g of phthalate anhydride was added and dissolved for 1 hour. The solution was cooled to −25° C. and 40 ml of $TiCl_4$ were added dropwise thereto. Then the temperature was raised slowly to 80° C., and 1.0 ml of diisooctyl phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 5.1 g of solid catalyst components were obtained. The particle size of the obtained catalyst component is shown in Table 1.

2. Polymerization of propylene: being carried out according to the Example 1. The polymerization results are shown in Table 2.

TABLE 1

Particle sizes of silica support and catalyst component

| Particle size (μm) | | D10 | D50 | D90 |
|---|---|---|---|---|
| Example 1 | Silica | 6.3 | 11 | 21 |
| | Catalyst component | 6.3 | 12 | 23 |
| Example 2 | Silica | 6.3 | 11 | 21 |
| | Catalyst component | 5.2 | 13 | 23 |
| Comparative Example 1 | Catalyst component | 7.6 | 28 | 109 |

TABLE 2

Polymerization results of catalyst

| Examples | Polymer yield kgPP/g Cat. | Isotacticity II % | Bulk density g/ml | Diameter Distribution of polymer particles | | | | |
|---|---|---|---|---|---|---|---|---|
| | | | | <20 mesh | 20-40 | 40-60 | 60-80 | >80 mesh |
| Example 1 | 27 | 95.9 | 0.38 | 4.6 | 43.4 | 38.8 | 8.4 | 4.2 |
| Example 2 | 31 | 94.0 | 0.35 | 4.0 | 66.2 | 18.0 | 6.8 | 5.2 |
| Comparative Example 1 | 27 | 94.9 | 0.36 | 29.9 | 33.4 | 18.1 | 13.5 | 4.7 |

It can be seen from the data given in Table 1, when silica having the same diameter is used, the particle diameter of the catalyst component of the present invention can be effectively adjusted by regulating the ratio of magnesium to silicon. Further, as comparing to the Comparative Example 1 wherein phthalate anhydride, rather than silica support, was used as co-precipitator, the catalyst components obtained in the Examples of the present invention exhibit narrower particle diameter distribution. Similarly, it can be seen from the data given in Table 2 that the polymer obtained by using the catalyst of the present invention exhibits narrower particle diameter distribution as well, which obviously has advantages in the industrial production of polymer.

EXAMPLE 3

1. Preparation of the Solid Catalyst Component

To a glass flask, in which air had been completely replaced with high pure $N_2$, were added successively 5.0 g of anhydrous magnesium dichloride, 100 ml of toluene, 7.0 ml of epoxy chloropropane, and 8.0 ml of tributyl phosphate. The mixture was heated at 60° C. to dissolve the solid completely. Then 3.0 g of silica (available from GRACE Corp., 2212-grade, $d_{50}$=11 μm, and the silica was dried at 600° C. for 4 hours before it was used) were added thereto. The solution was cooled to −25° C. and 40 ml of $TiCl_4$ were added dropwise thereto. Then the temperature was raised slowly to 80° C., and 1.0 ml of diisooctyl phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 8.0 g of solid catalyst components were obtained.

2. Polymerization of propylene: being carried out according to the Example 1, except for using 15.2 mg of above catalyst component. The polymerization results are shown in Table 3.

EXAMPLE 4

1. Preparation of the Solid Catalyst Component

To a glass flask, in which air had been completely replaced with high pure $N_2$, were added successively 2.5 g of anhydrous magnesium dichloride, 100 ml of toluene, 4.5 ml of epoxy chloropropane, and 3.0 ml of tributyl phosphate. The mixture was heated at 80° C. to dissolve the solid completely. Then 5.0 g of silica (available from GRACE Corp., 2212 grade, $d_{50}$=11 μm, and the silica was dried at 600° C. for 4 hours before it was used) were added thereto. The solution was cooled to −25° C. and 40 ml of $TiCl_4$ were added dropwise thereto. Then the temperature was raised slowly to 80° C., and 1.0 ml of diisooctyl phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 8.4 g of solid catalyst components were obtained.

2. Polymerization of propylene: being carried out according to the Example 1, except for using 8.5 mg of above catalyst component.

The polymerization results are shown in Table 3.

EXAMPLE 5

1. Preparation of the Solid Catalyst Component:

The procedure as described in Example 3 was followed, except for replacing diisooctyl phthalate with di(n-butyl) phthalate.

2. Polymerization of propylene: being carried out according to the Example 1, except for using 21 mg of above catalyst component.

The polymerization results are shown in Table 3.

EXAMPLE 6

1. Preparation of the Solid Catalyst Component

To a glass flask, in which air had been completely replaced with high pure $N_2$, were added successively 5.0 g of anhydrous magnesium dichloride, 100 ml of toluene, 7.0 ml of epoxy chloropropane, and 8.0 ml of tributyl phosphate. The mixture was heated at 60° C. to dissolve the solid completely. Then 1.0 ml of di(n-butyl) phthalate were added thereto, followed by the addition of 5.0 g of silica (available from GRACE Corp., 2212 grade, $d_{50}$=11 μm, and the silica was dried at 600° C. for 4 hours before it was used). The solution was cooled to −25° C. and 40 ml of $TiCl_4$ were added dropwise thereto. Then the temperature was raised slowly to 80° C., and 1.0 ml of di(n-butyl) phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 10.5 g of solid catalyst components were obtained.

2. Polymerization of propylene: being carried out according to the Example 1, except for using 20.1 mg of above catalyst component. The polymerization results are shown in Table 3.

TABLE 3

Polymerization results of catalysts

| Examples | Activity of catalyst kgPP/g Cat. | Isotacticity II % |
|---|---|---|
| Example 3 | 20 | 97.0 |
| Example 4 | 23 | 96.9 |
| Example 5 | 27 | 96.5 |
| Example 6 | 32 | 98.0 |

EXAMPLE 7

1. Preparation of the Solid Catalyst Component

To a glass flask, in which air had been completely replaced with high pure $N_2$, were added successively 5.0 g of anhydrous magnesium dichloride, 100 ml of toluene, 7.0 ml of epoxy chloropropane, and 8.0 ml of tributyl phosphate. The mixture was heated at 60° C. to dissolve the solid completely. Then 1.0 ml of di(n-butyl) phthalate were added thereto. The solution was cooled to −25° C. and 40 ml of $TiCl_4$ were added dropwise thereto, followed by the addition of 3.0 g of silica (available from GRACE Corp., $d_{50}$=24 μm, and the silica was dried at 600° C. for 4 hours before it was used). Then the temperature was raised slowly to 80° C., and 1.0 ml of di(n-butyl) phthalate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 11 g of solid catalyst components were obtained. The $d_{50}$ of the catalyst component was found as 33 μm.

2. Polymerization of propylene: being carried out according to the Example 1, except for using 17.6 mg of above catalyst component and polymerizing for 1 hour.

Catalyst activity; 18 kgPP/gcat; isotacticity of the polymer: 98.7%.

| Diameter distribution of polymer particles Diameter distribution | | | | |
|---|---|---|---|---|
| <20 mesh | 20-40 | 40-60 | 60-80 | >80 mesh |
| 26.6 | 63.1 | 7.3 | 2.2 | 0.8 |

EXAMPLE 8

1. Preparation of the solid catalyst component: following the procedure as described in the Example 6.

2. Copolymerization of Ethylene and Propylene:

In a 2 liter stain-less steel autoclave wherein air was sufficiently replaced with $N_2$, 11.3 mg of the foregoing solid catalyst component, 2.5 mmol of triethyl aluminum and 1.0 mmol of CHUMS were added, then 6 L (standard volume) hydrogen gas was added, and liquid propylene was added until the total volume was 1.0 L. The temperature was raised to 70° C., and the polymerization was carried out at 70° C. for 0.5 hours. After cooling to room temperature, unreacted gases were vented, then the temperature was raised to 75° C., and a propylene mixture gas containing 40 mol % ethylene was introduced in the reactor. The gas phase polymerization was carried out at 0.6 MPa for 1 hour (110 g of mixture gas was consumed), and 207 g of polymer were obtained. The ethylene content in polypropylene was found as 19 mol % by IR method.

EXAMPLE 9

1. Preparation of the Solid Catalyst Component

To a glass flask, in which air had been completely replaced with high pure $N_2$, were added successively 5.0 g of anhydrous magnesium dichloride, 120 ml of toluene, 8.0 ml of epoxy chloropropane, and 9.0 ml of tributyl phosphate. The mixture was heated at 60° C. to dissolve the solid completely. Next, 0.5 ml of 4-ethyl-heptan-3,5-diol dibenzoate was added. The solution was cooled to −25° C. and 50 ml of $TiCl_4$ were added dropwise thereto. After the solution was stirred at −25° C. for 0.5 hour, 3.0 g of silica (available from GRACE Corp., XP02485, the silica was dried at 600° C. for 4 hours before it was used) were added. Then the temperature was raised slowly to 90° C., and 0.5 ml of 4-ethyl-heptan-3,5-diol dibenzoate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 11.0 g of solid catalyst components were obtained.

The particle sizes and distribution of the solid catalyst component: $D_{50}$=31 μm, $D_{10}$=19.5 μm, $D_{90}$=52.2 μm, and $D_{50}/(D_{90}-D_{10})$=0.95.

2. Polymerization of Propylene:

In a 2 L stain-less steel autoclave wherein air was sufficiently replaced with $N_2$, 17.3 mg of the foregoing solid catalyst component, 2.0 mmol of triethyl aluminum and 1.0 mmol of CHMMS were charged, then 1 L (standard volume) of hydrogen gas was added, and liquid propylene was added until the total volume was 1.0 L. The reactor was heated to 70° C. The polymerization was carried out at 70° C. for 1 hours, and 208 g of polymer were obtained. The polymerization results are shown in Tables 4 and 5.

EXAMPLE 10

1. Preparation of the Solid Catalyst Component

To a glass flask, in which air had been completely replaced with high pure $N_2$, were added successively 5.0 g of anhydrous magnesium dichloride, 120 ml of toluene, 8.0 ml of epoxy chloropropane, and 90 ml of tributyl phosphate. The mixture was heated at 60° C. to dissolve the solid completely. The solution was cooled to −25° C. and 50 ml of TiCl were added dropwise thereto. After the solution was stirred at −25° C. for 0.5 hour, 3.0 g of silica (available from GRACE Corp., XP02485, the silica was dried at 600° C. for 4 hours before it was used) were added. Then the temperature was raised slowly to 90° C., and 1.5 ml of 4-ethyl-heptan-3,5-diol dibenzoate was added in the course of raising the temperature. Solids precipitated gradually during the heating. The resultant solids were treated with 40 ml of titanium tetrachloride. After filtering, the solids were washed with toluene twice and with hexane twice, and dried under a vacuum, and 10.6 g of solid catalyst components were obtained.

2. Polymerization: being carried out according to the Example 9. The polymerization results are shown in Tables 4 and 5.

EXAMPLE 11

1. Preparation of the solid catalyst component: following the procedure as described in the Example 10, except for replacing 4-ethyl-heptan-3,5-diol dibenzoate with di(n-butyl) phthalate.

2. Polymerization of propylene: being carried out according to the Example 9. The polymerization results are shown in Table 4.

TABLE 4

Polymerization results of catalysts

| Examples | Polymer yield kgPP/g Cat. | Isotacticity II % | Mw/Mn | Bulk density g/ml |
|---|---|---|---|---|
| Example 9 | 12 | 98.2 | 3.8 | 0.40 |
| Example 10 | 21 | 97.3 | 5.1 | 0.39 |
| Example 11 | 17 | 98.7 | 5.6 | 0.36 |

TABLE 5

Results of sieving polymer powders

| Examples | <10 mesh | 10~14 mesh | 14~20 mesh | 20-40 mesh | 40-60 mesh | 60-80 mesh | 80~100 mesh | 100~160 mesh | 160-200 mesh | >200 |
|---|---|---|---|---|---|---|---|---|---|---|
| Example 9 | 0 | 0 | 1.6 | 80.5 | 16.0 | 1.8 | 0 | 0 | 0 | 0 |
| Example 10 | 0 | 0 | 0.8 | 80.6 | 13.1 | 4.8 | 0.6 | 0 | 0 | 0 |

What is claimed is:

1. A process of preparing a catalyst component for olefin polymerization, the process comprising the steps of:

(1) dissolving a magnesium halide in a solvent system comprising an organic epoxy compound and an organo phosphorus compound, to form a homogenous solution; and (2) contacting and reacting said solution with at least one titanium compound of the general formula $Ti(OR^3)_{4-m}X_m$, in which $R^3$ is a $C_1$-$C_{14}$ aliphatic hydrocarbyl group, X is selected from the group consisting of F, Cl, Br and mixture thereof, and m is an integer of from 1 to 4, in the presence of an inorganic oxide, to precipitate a solid titanium-containing catalyst component;

with at least one inner electron-donor compound being introduced in any of said steps, wherein the inner electron-donor compound is selected from the group consisting of:

(i) aliphatic or aromatic polybasic carboxylic acid ester compounds;

(ii) polyol ester compounds of the general formula (I),

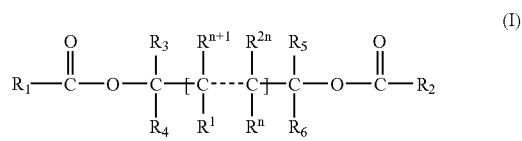

wherein $R_1$, to $R_6$ and $R^1$ to $R^{2n}$, which may be identical or different, are hydrogen, halogen, optionally substituted linear or branched $C_1$-$C_{20}$ alkyl, $C_3$-$C_{20}$ cycloalkyl, $C_6$-$C_{20}$ mono-ring or multi-ring aryl, $C_7$-$C_{20}$ alkylaryl, $C_7$-$C_{20}$ arylalkyl, $C_2$-$C_{10}$ alkenyl, or $C_2$-$C_{10}$ ester group, with the proviso that $R_1$ and $R_2$ are not hydrogen, $R_3$ to $R_6$ and $R^1$ to $R^{2n}$ optionally comprise one or more heteroatoms, selected from the group consisting of nitrogen, oxygen, sulfur, silicon, phosphorus and halogen, replacing carbon or hydrogen or both, and one or more of $R_3$ to $R_6$ and $R^1$ to $R^{2n}$ may be linked to form a ring; and n is an integer ranging from 0 to 10; and (iii) 1,3-diether compounds of the general formula (IV),

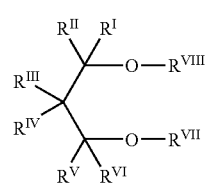

wherein $R^I$, $R^{II}$, $R^{III}$, $R^{IV}$, $R^V$ and $R^{VI}$, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl, and $R^{VII}$ and $R^{VIII}$, which may be identical or different, are selected from the group consisting of linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and groups $R^I$ to $R^{VI}$ may link each other to form a ring.

2. The process of claim 1 wherein the inorganic oxide is silica.

3. The process of claim 2 wherein the silica has an average particle diameter of from 2 to 30 μm.

4. The process of claim 2 wherein silica is added in an amount of from 0.5 to 5 grams per gram of magnesium halide.

5. The process of claim 2 wherein the silica support is added after the titanium compound is added to and reacts with the magnesium halide solution.

6. The process of claim 1 wherein the amount of organic epoxy compound used is in a range of from 0.2 to 10 moles, the amount of organo phosphorus compound used is in a range of from 0.1 to 5.0 moles1 the amount of titanium compound used is in a range of from 1 to 20 moles, and the amount of inner electron-donor compound used is in a range of from 0.01 to 5.0 moles, based on per mole of magnesium halide.

7. The process of claim 6 wherein the amount of organic epoxy compound used is in a range of from 0.5 to 4 moles, the amount of organo phosphorus compound used is in a range of from 0.3 to 1.0 moles, the amount of titanium compound used is in a range of from 4 to 10 moles, and the amount of inner electron-donor compound used is in a range of from 0.05 to 1.0 moles, based on per mole of magnesium halide.

8. The process of claim 1 wherein
the inner electron-donor compound is selected from the group consisting of: phthalates, malonates, succinates, glutarates, adipates, pivalates, maleates, naphthalene dicarboxylates, trimellitates, benzene-1,2,3-tricarboxylic acid esters, pyromellitates and carbonates;
a compound of the general formula (II),

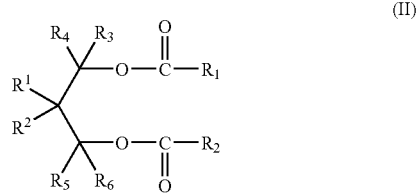

wherein $R_1$ to $R_6$ and $R^1$ to $R^2$ are as defined in the general formula (I); and
a compound of the general formula (III);

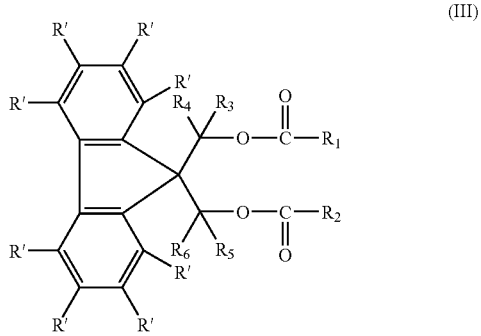

wherein groups $R_1$-$R_6$ are as defined in the general formula (I): R' is identical or different, are and can be hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl, or $C_7$-$C_{20}$ arylalkyl.

9. A process of preparing a catalyst component for olefin polymerization, the process comprising the steps of;

(1) dissolving magnesium dichloride in a solvent system comprising an organic epoxy compound and an organo phosphorus compound, to form a homogenous solution; and
(2) contacting and reading said solution with at least one titanium compound of the general formula $Ti(OR^3)_{4-m}X_m$, in which $R^3$ is a $C_1$-$C_{14}$ aliphatic hydrocarbyl group, X is selected from the group consisting of F, Cl, Br and mixture thereof, and m is an integer of from 1 to 4, in the presence of silica, to precipitate a solid titanium-containing catalyst component; with at least one inner electron-donor compound being introduced in any of said steps, wherein the inner electron-donor compound is selected from the group consisting of:
(i) aliphatic or aromatic polybasic carboxylic acid ester compounds;
(ii) polyol ester compounds of the general formula (I),

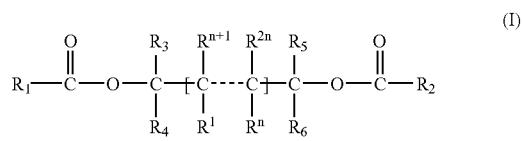

wherein $R_1$ to $R_6$ and $R^1$ to $R^{2n}$, which may be identical or different, are hydrogen, halogen, or optionally substituted linear or branched $C_1$-$C_{20}$ alkyl, $C_3$-$C_{20}$ cycloalkyl, $C_6$-$C_{20}$ mono-ring or multi-ring aryl, $C_7$-$C_{20}$ alkylaryl, $C_7$-$C_{20}$ arylalkyl, $C_2$-$C_{10}$ alkenyl, or $C_2$-$C_{10}$ ester group, with the proviso that $R_1$ and $R_2$ are not hydrogen, $R_3$ to $R_6$ and $R^1$ to $R^{2n}$ optionally comprise one or more heteroatoms, selected from the group consisting of nitrogen, oxygen, sulfur, silicon, phosphorus and halogen, replacing carbon or hydrogen or both, and one or more of $R_3$ to $R_6$ and $R^1$ to $R^{2n}$ may be linked to form a ring; and n is an integer ranging from 0 to 10; and
(iii) 1,3-diether compounds of the general formula (IV),

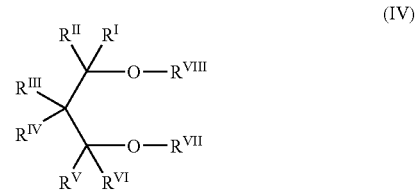

wherein $R^I$, $R^{II}$, $R^{III}$, $R^{IV}$, $R^V$ and $R^{VI}$, which may be identical or different, are selected from the group consisting of hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl, and $R^{VII}$ and $R^{VIII}$, which may be identical or different, are selected from the group consisting of linear or branched $C_1$-$C_{20}$ alkyl, $C_3$-$C_{20}$ cycloalkyl, $C_6$-$C_{20}$ aryl, $C_7$-$C_{20}$ alkylaryl and $C_7$-$C_{20}$ arylalkyl; and groups $R^I$ to $R^{VI}$ may link each other to form a ring.

10. The process of claim 9 wherein the silica has an average particle diameter of from 2 to 30 µm, and is added in an amount of from 0.5 to 5 grams per gram of magnesium dichloride.

11. The process of claim 10 wherein the silica support is added after the titanium compound is added to and reacts with the magnesium dichloride solution.

12. The process of claim 9 wherein the amount of organic epoxy compound used is in a range of from 0.5 to 4 moles, the amount of organo phosphorus compound used is in a range of from 0.3 to 1.0 moles, the amount of titanium compound used is in a range of from 4 to 10 moles, and the amount of inner electron-donor compound used is in a range of from 0.05 to 1.0 moles, based on per mole of magnesium dichloride, and wherein the organic epoxy compound comprises at least one of aliphatic epoxy compounds and diepoxy compounds, halogenated aliphatic epoxy compounds and diepoxy compounds, glycidyl ether, and inner ethers, having from 2 to 8 carbon atoms, and the organo phosphorus compound is at least one of hydrocarbyl esters or halogenated hydrocarbyl esters of orthophosphoric acid or phosphorous acid.

13. The process of claim 9 wherein
the inner electron-donor compound is selected from the group consisting of: phthalates, malonates, succinates, glutarates, ad pates, pivalates, maleates, naphthalene dicarboxylates, trimellitates, benzene-1,2,3-tricarboxylic acid esters, pyromellitates and carbonates;
a compound of the general formula (II),

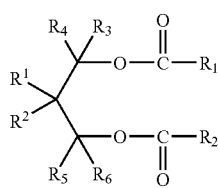

(II)

wherein $R_1$ to $R_6$ and $R^1$ to $R^2$ are as defined in the general formula (I); and a compound of the general formula (III);

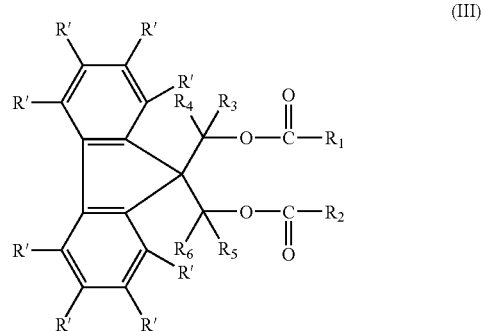

(III)

wherein groups $R_1$-$R_6$ are as defined in the general formula (I): R' is identical or different, are, and can be hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl, or $C_7$-$C_{20}$ arylalkyl.

* * * * *